United States Patent
Tessmer et al.

(10) Patent No.: US 9,602,375 B2
(45) Date of Patent: *Mar. 21, 2017

(54) TRACING HOST-ORIGINATED LOGICAL NETWORK PACKETS

(71) Applicant: Nicira, Inc., Palo Alto, CA (US)

(72) Inventors: Alexander Tessmer, Mountain View, CA (US); Jianjun Shen, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,983

(22) Filed: Jan. 10, 2016

(65) Prior Publication Data

US 2016/0127214 A1 May 5, 2016

Related U.S. Application Data

(63) Continuation of application No. 14/052,765, filed on Oct. 13, 2013, now Pat. No. 9,264,330.

(51) Int. Cl.
*H04L 12/28* (2006.01)
*H04L 12/26* (2006.01)

(52) U.S. Cl.
CPC .......... *H04L 43/0811* (2013.01); *H04L 43/10* (2013.01); *H04L 43/50* (2013.01)

(58) Field of Classification Search
CPC ....................................................... H04L 43/10

(Continued)

(56) References Cited

U.S. PATENT DOCUMENTS 5,224,100 A 6/1993 Lee et al.
5,245,609 A 9/1993 Ofek et al.
(Continued)

FOREIGN PATENT DOCUMENTS

JP 2002-141905 5/2002
WO WO 95/06989 3/1995
WO WO 2013/184846 12/2013

OTHER PUBLICATIONS

Phaal, Peter, et al., "sFlow Version 5", Jul. 2004, 46 pages, sflow.org.

(Continued)

*Primary Examiner* — Mark Rinehart
*Assistant Examiner* — Matthew Hopkins
(74) *Attorney, Agent, or Firm* — Adeli LLP

(57) ABSTRACT

Some embodiments provide a method for a first host machine that hosts a virtual machine connected to a particular logical network. The method receives a command to test connectivity between the first host machine and a set of at least one additional host machine that also host virtual machines on the particular logical network. At the first host machine, the method generates a packet for sending to the set of additional host machines in order to test the connectivity. The method appends to the generated packet (i) information that identifies the particular logical network and (ii) a flag indicating that the packet is for connectivity testing. The method encapsulates the generated packet with tunnel endpoint addresses, including a tunnel endpoint located at the first host machine. The method sends the encapsulated packet from the first host machine to the set of additional host machines according to the tunnel encapsulation.

20 Claims, 8 Drawing Sheets

(58) Field of Classification Search
USPC .......................................................... 370/353
See application file for complete search history.

(56) References Cited

U.S. PATENT DOCUMENTS

| | | | |
|---|---|---|---|
| 5,265,092 A | 11/1993 | Soloway et al. | |
| 5,781,534 A | 7/1998 | Perlman et al. | |
| 6,104,700 A | 8/2000 | Haddock et al. | |
| 6,430,160 B1 | 8/2002 | Smith et al. | |
| 6,721,334 B1 | 4/2004 | Ketcham | |
| 7,079,544 B2 | 7/2006 | Wakayama et al. | |
| 7,627,692 B2 | 12/2009 | Pessi | |
| 7,639,625 B2 | 12/2009 | Kaminsky et al. | |
| 7,706,266 B2 | 4/2010 | Plamondon | |
| 7,760,735 B1 | 7/2010 | Chen et al. | |
| 7,808,919 B2 | 10/2010 | Nadeau et al. | |
| 7,937,492 B1 | 5/2011 | Kompella et al. | |
| 8,024,478 B2 | 9/2011 | Patel | |
| 8,254,273 B2 | 8/2012 | Kaminsky et al. | |
| 8,345,558 B2 | 1/2013 | Nicholson et al. | |
| 8,351,418 B2 | 1/2013 | Zhao et al. | |
| 8,611,351 B2 | 12/2013 | Gooch et al. | |
| 8,750,288 B2 | 6/2014 | Nakil et al. | |
| 8,837,300 B2 | 9/2014 | Nedeltchev et al. | |
| 9,059,926 B2 | 6/2015 | Akhter et al. | |
| 9,226,220 B2 | 12/2015 | Banks et al. | |
| 9,264,330 B2 * | 2/2016 | Tessmer | H04L 43/0811 |
| 2005/0132044 A1 | 6/2005 | Guingo et al. | |
| 2005/0232230 A1 | 10/2005 | Nagami et al. | |
| 2006/0028999 A1 | 2/2006 | Iakobashvili et al. | |
| 2006/0029056 A1 | 2/2006 | Perera et al. | |
| 2006/0037075 A1 | 2/2006 | Frattura et al. | |
| 2006/0206655 A1 | 9/2006 | Chappell et al. | |
| 2006/0282895 A1 | 12/2006 | Rentzis et al. | |
| 2007/0055789 A1 | 3/2007 | Claise et al. | |
| 2008/0049614 A1 | 2/2008 | Briscoe et al. | |
| 2008/0049786 A1 | 2/2008 | Ram et al. | |
| 2009/0010254 A1 | 1/2009 | Shimada et al. | |
| 2010/0128623 A1 | 5/2010 | Dunn et al. | |
| 2011/0317696 A1 | 12/2011 | Aldrin et al. | |
| 2012/0159454 A1 | 6/2012 | Barham et al. | |
| 2012/0287791 A1 | 11/2012 | Xi et al. | |
| 2013/0067067 A1 | 3/2013 | Miri et al. | |
| 2013/0332602 A1 * | 12/2013 | Nakil | G06N 99/005 709/224 |
| 2014/0029451 A1 | 1/2014 | Nguyen | |
| 2014/0119203 A1 | 5/2014 | Sundaram et al. | |
| 2014/0195666 A1 | 7/2014 | Dumitriu et al. | |
| 2014/0281030 A1 | 9/2014 | Cui et al. | |

OTHER PUBLICATIONS

Phan, Doantam, et al., "Visual Analysis of Network Flow Data with Timelines and Event Plots," Month Unknown, 2007, 16 pages, VizSEC.

* cited by examiner

TRACING HOST-ORIGINATED LOGICAL NETWORK PACKETS

CLAIM OF BENEFIT TO PRIOR APPLICATION

This application is a continuation application of U.S. patent application Ser. No. 14/052,765, filed Oct. 13, 2013, now published as U.S. Patent Publication 2015/0103679. U.S. patent application Ser. No. 14/052,765 is incorporated herein by reference.

BACKGROUND

Typical physical networks include many routers and switches through which packets travel. In some cases for such networks, an administrator may identify that packets are not being delivered correctly, and therefore may wish to troubleshoot the network. For instance, the "ping" functionality may be used to identify whether one machine is reachable from another machine.

However, in at least some virtualized networks that operate many separate logical networks over the same physical network, packets are typically sent across the physical network in tunnels between managed forwarding elements. These tunneled packets may not take the same path as typical ping packets would, as the ping packets do not go through the encapsulation/decapsulation process. As such, while using a standard ping operation may determine that two host machines in such a network could communicate, this operation would not serve to replicate actual logical network traffic.

BRIEF SUMMARY

Some embodiments provide a method for testing connectivity between two or more host machines in a network using a packet encapsulated as for logical network traffic between the host machines. In some embodiments, a first host machine generates a packet to send for the connectivity test, then (i) inserts logical network information into the generated packet and (ii) encapsulates the generated packet with tunnel endpoint information that specifies a tunnel between the first host machine and a second host machine.

In some embodiments, the first host machine initiates the method when the host machine receives a command to test connectivity between the first host machine and a set of additional host machines that host virtual machines connected with a particular logical network. That is, a virtual machine operating on the first host machine is on the same logical network as virtual machines operating on each of the additional host machines. In different embodiments, the first host machine receives the command from a network controller or from a user (e.g., a logical network administrator) directly logging into the host machine.

Upon receiving the command, an application of some embodiments that operates on the host machine generates a packet to send to the other host machines for the requested connectivity test. Some embodiments use a standard Internet Control Message Protocol (ICMP), or ping, packet. However, rather than simply send a ping directly from the first host machine to another host machine, the virtual switch of some embodiments encapsulates the packet as though the packet was sent on a logical network.

In order to create such a logical network packet, a virtual switch of some embodiments on the host machine first inserts or appends a logical network section to the packet. This logical network section, in some embodiments, includes both a logical network identifier (e.g., a UUID that identifies the logical network for which the connectivity is being tested) and a set of flags. These flags include a marker that identifies the packet, in the logical network header, as a test packet (e.g., a single or multi-bit flag). Without such a marker, a virtual switch receiving the packet at one of the additional hosts would not realize that the packet is a test packet and would attempt to deliver the packet to a destination address specified in the encapsulated packet (e.g., the header of the ICMP packet). Instead, the receiving virtual switch identifies the marker in the logical network header and the second host machine sends a response packet back to the originating host machine.

In addition to the logical network header, some embodiments encapsulate the packet in a tunnel between the sending virtual switch performing the encapsulation and the receiving virtual switch at one of the other host machines. In some embodiments, the encapsulation is performed by a tunnel endpoint (e.g., a virtual tunnel endpoint, or VTEP) at the host machine. To perform the encapsulation, the tunnel endpoint of some embodiments adds both layer 2 and layer 3 source and destination addresses, using its own addresses for the source and the receiving tunnel endpoint addresses as the destination.

When the command specifies multiple destinations for the connectivity test (e.g., for broadcast or multicast packets), in some embodiments the tunnel endpoint residing on the host machine replicates the generated packet with the logical network header before adding the encapsulation, so as to send one packet per recipient. The tunnel endpoint then adds different encapsulations for each replicated packet, with packets for different tunnel endpoints having different destination addresses.

When sending such multicast/broadcast packets in a network with multiple segments, some embodiments send packets to a single proxy in different network segments, which in turn replicates the packet to all of the destinations within its segment. By using the tunnel encapsulation and these proxies for multicast/broadcast test packets, the virtual switch tests the actual connections through which a packet would travel from the first host machine to a second host machine in a different segment, rather than a more direct connection between the first and second host machines.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for testing connectivity between two or more host machines in a network using a packet encapsulated as for logical network traffic between the host machines. In some embodiments, a first host machine generates a packet to send for the connectivity test, then (i) inserts logical network information into the generated packet and (ii) encapsulates the generated packet with tunnel endpoint information that specifies a tunnel between the first host machine and a second host machine.

In some embodiments, the host machine is a physical computer (e.g., a server) that hosts one or more virtual machines (VMs) in a data center (e.g., a multi-tenant data center). These VMs may belong to one or more tenants, and operate on different logical networks within the data center. For example, the host machine might host (i) a first VM that connects to a first logical network along with a first set of additional VMs operating on a first set of additional host machines, and (ii) a second VM that connects to a second logical network along with a second set of additional VMs operating on a second set of additional host machines.

In some embodiments, the logical networks connect a set of end machines (e.g., VMs, physical hosts, etc.) across a physical network. The physical network over which the logical network traffic is sent may be entirely located within a data center, may bridge several data centers, and may even connect to non-data center machines. For example, a particular tenant company might have a logical network that connects VMs within multiple data centers and host machines in an enterprise network at the company's local site.

Instead of being defined by the physical network, the logical network relies on information attached to data packets to identify the packets as belonging to one logical network or another. Virtual switches on the host machines add these identifiers to packets (e.g., based on from which VM a packet is received) and recognize the identifiers in order to forward packets to the appropriate destination (e.g., appropriate VM). Furthermore, the host machines encapsulate the packets in tunnels for travel across the physical network, so that the underlying network elements (e.g., switches, routers, etc.) do not require any of the logical network information.

Figure 1:
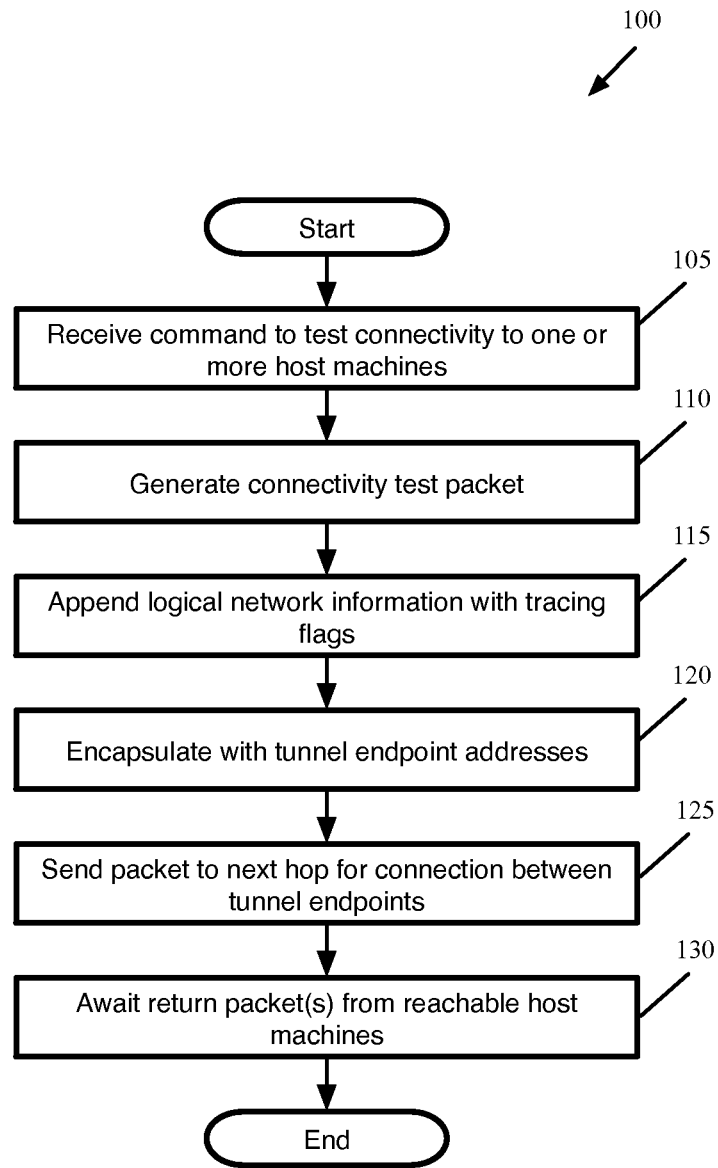
FIG. 1 conceptually illustrates a process of some embodiments performed by a host machine in order to test connectivity for a logical network.

FIG. 1 conceptually illustrates a process 100 of some embodiments performed by a host machine in order to test connectivity for a logical network. In some embodiments, the host machine can test connectivity for any logical network that is setup on the host machine (i.e., any logical network for which the host machine could host a VM).

As shown, the process 100 begins by receiving (at 105) a command to test connectivity to one or more host machines on which the logical network is also setup. In some embodiments, the host machines receive instructions (e.g., to setup a logical network, configure VMs, etc.) from one or more sets of network controllers. In some such embodiments, the host machine receives the command to initiate the connectivity test through the interface by which these controllers send configuration information to the host machine. In other embodiments, users may log in directly to the host machine and thereby send commands to initiate the connectivity test operation. The command may specify a particular destination host machine and logical network. In some cases, the command specifies a multicast or broadcast destination (e.g., broadcasting to all of the machines connected to a particular logical network).

Next, the process 100 generates (at 110) a connectivity test packet to send to the one or more destination machines for the requested connectivity test. Some embodiments use a standard Internet Control Message Protocol (ICMP), or ping, packet. Other embodiments may send other types of traffic, or allow the user to configure the packet sent for the connectivity test. In some embodiments, an application that operates on the host machine generates the packet. Upon receiving the command to test connectivity, a process in the host machine (e.g., a daemon) that listens on the configuration interface of the host machine sends a command to this packet generation application to generate the packet. Once the packet is generated, rather than simply send a ping directly from the first host machine to another host machine, the virtual switch of some embodiments encapsulates the packet as though the packet was sent from one VM to another VM on the same logical network.

Thus, the process next appends (at 115) or inserts logical network information to the connectivity test packet. In some embodiments, the generated test packet is sent to the virtual switch on the host, which stores the logical network data for various logical networks supported by the host machine. The virtual switch uses this logical network data to append the correct logical network information to the packet in a designated logical network information section. In some embodiments, the logical network section includes both a logical network identifier (e.g., a UUID that identifies the logical network for which the connectivity is being tested) and a set of flags. These flags include a marker that identifies the packet as a test packet (e.g., a single or multi-bit flag). Without such a marker, a virtual switch receiving the packet at one of the additional hosts would not realize that the packet is a test packet and would therefore attempt to deliver the packet to a destination address specified in the encapsulated packet (e.g., the header of the ICMP packet). Instead, the receiving virtual switch identifies the marker in the logical network header and the second host machine sends a response packet (e.g., an ICMP Response) back to the originating virtual switch at the first host machine.

The process 100 next encapsulates (at 120) the packet in a tunnel between two tunnel endpoints. In some embodiments, each host machine includes a tunnel endpoint (e.g., a virtual tunnel endpoint, or VTEP), which performs this encapsulation. Each VTEP connects to the virtual switch at the host machine, and has its own layer 2 and layer 3 addresses (e.g., MAC and IP addresses, respectively). In order to perform the encapsulation, the tunnel endpoint adds both layer 2 and layer 3 source and destination addresses. For the source addresses, the tunnel endpoint uses its own addresses. In some embodiments, the tunnel endpoint stores data regarding other tunnel endpoints located on different host machines in the network, including the addresses of those other tunnel endpoints. By encapsulating the packet with this tunneling information, the packet can travel through the intermediary network elements (e.g., switches, routers, etc.). The internal structure of the packet, including the logical network information, is transparent to these intermediary elements, which only see the tunnel endpoint addresses used to implement an overlay.

Next, the process 100 sends (at 125) the encapsulated packet to the appropriate next hop for the connection between tunnel endpoints. In some cases, there is a direct tunnel between the source host machine at which the packet is generated and the destination host machine. This direct tunnel may involve processing by intermediary network elements that only forward the packet based on the tunnel header.

As mentioned, the command received to initiate the connectivity test may indicate a single destination (e.g., one host machine) or multiple destinations (e.g., a broadcast to all host machines that host VMs connected to a particular logical network). When the command specifies multiple destinations for the connectivity test (e.g., for broadcast or multicast packets), in some embodiments the tunnel endpoint residing on the host machine replicates the generated packet with the logical network headers before adding the encapsulation, so as to send one packet per recipient. The tunnel endpoint then adds different encapsulations for each replicated packet, with packets for different tunnel endpoints having different destination addresses.

When sending such multicast/broadcast packets in a network with multiple segments, some embodiments send packets to a single proxy in different network segments, which in turn replicates the packet to all of the destinations within its segment. By using the tunnel encapsulation and these proxies for multicast/broadcast test packets, the virtual switch tests the actual connections through which a packet would travel from the first host machine to a second host machine in a different segment, rather than a more direct connection between the first and second host machines.

After sending the packet or packets, the process 100 awaits (at 130) one or more return packets from the destination host machines. The process ends. When the generated packet reaches a destination host machine, the tunnel endpoint at that host machine will remove the tunnel encapsulation before passing the packet to the virtual switch. The virtual switch identifies the logical network information in the packet as well as the flag that marks the packet as a connectivity test packet. Accordingly, the host machine generates a reply to send back to the source machine. In some embodiments, this reply follows a direct path to the original source host machine, and is not encapsulated. That is, even if the packet was sent using a proxy host for a network segment, the ultimate destination sends a direct unencapsulated ICMP response to the originating source host. On the other hand, some embodiments do encapsulate the response packet, which may still be sent directly to the original source host machine. The source host machine can then identify which destinations sent a reply, indicating reachability, and pass this information back to the controller or user that sent the command to initiate the connectivity test process.

The above description introduces the connectivity testing process of some embodiments. Several more detailed embodiments are described below. First, Section I describes in further detail the operation of a host to generate and send the connectivity test packets. Section II then describes the paths taken by these packets through the network, as well as the reply packets. Finally, Section III describes an electronic system with which some embodiments of the invention are implemented.

I. Test Packet Generation

Figure 2:
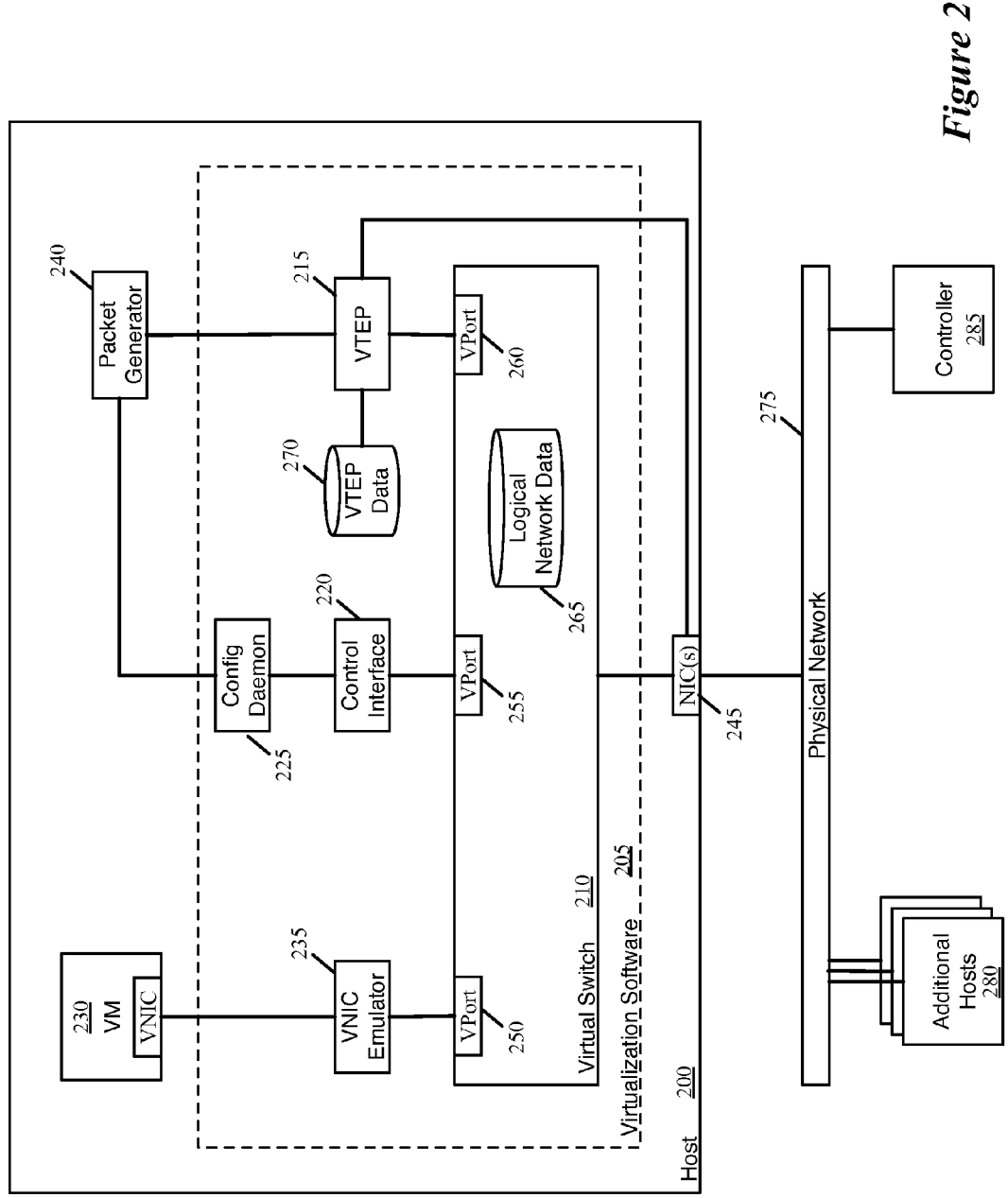
FIG. 2 conceptually illustrates the architecture of a host that generates, encapsulates, and sends test packets in order to test connectivity with another host for logical network traffic.

As mentioned, the host machine of some embodiments generates, encapsulates, and sends test packets in order to test connectivity with another host for logical network traffic. FIG. 2 conceptually illustrates the architecture of such a host 200. In some embodiments, the host 200 is one of several (e.g., dozens, hundreds, thousands, etc.) of host machines within a multi-tenant data center. Each host machine in the data center, or each of a subset of the host machines, is structured similarly in some embodiments.

As shown, the host machine 200 connects to a physical network 275. This network 275, in some embodiments, includes the physical network (e.g., switches, routers, etc.) within a data center. For example, the host machine 200 might be one of numerous servers in a rack of servers, which all connect to a top of rack switch. This rack of servers are then connected to additional racks within the data center via various physical switches, routers, etc. In some embodiments, packets may be sent across intervening networks between data centers as well. As shown, the physical network 275 connects the host 200 to additional hosts 280 and network controller 285.

The host machine 200 includes virtualization software 205, which includes a virtual switch 210, a virtual tunnel endpoint 215, a control interface 220, and a configuration daemon 225. In addition, the host machine includes a packet generator 240 and a virtual machine 230, which connects to the virtual switch 210 via a VNIC emulator 235. The VM 230 and the packet generator 240 operate outside of the virtualization software 205 in some embodiments.

In some embodiments, the virtualization software 205 may include one or more virtual machine monitors, hypervisors, or virtualization kernels. The virtualization software 205 represents a component or set of components interposed between one or more VMs and the host machine platform. The virtualization software 205, in addition to the functions shown in this figure, virtualizes the physical hardware of the host machine in order to provide this virtualized hardware to the VMs operating on the host (e.g., VM 230).

The host 200 additionally includes one or more network interface cards (NICs) 245, and associated device drivers. These NICs 245 connect the host machine 200 to the physical network 275, and enable the host machine to send and receive both data traffic (e.g., packets exchanged with other host machines) and control traffic (e.g., commands from an administrator or network controller).

The virtual switch 210, in some embodiments, is responsible for forwarding packets sent to and received from the various components on the host machine 200. These components include the VM 230 (and any additional VMs), the control interface 220, the VTEP 215, etc. In some embodiments, the virtual switch 210 maintains a forwarding database of addresses for the various components to which it forwards traffic (e.g., MAC addresses of virtual network interface cards (VNICs) of the VMs, etc.). In this way, the virtual switch enables multiple VMs, as well as other components, to share the one or more NICs 245 of the host machine 200.

In addition to simply forwarding packets, the virtual switch 210 of some embodiments enables virtual machines on different host machines to be connected via logical networks. As shown, the virtual switch 210 (also referred to as distributed virtual switches) stores logical network data 265. In some embodiments, the logical networks are implemented through logical network identifiers added to packets sent between the VMs on a logical network. The virtual switch 210 stores data associated with a virtual port (e.g., virtual port 250), that associates the virtual port with a particular logical network. Only network traffic that is received with the logical network ID for a particular virtual port is sent to the VM through that virtual port (and only then if the destination address matches that of the VM). This enables numerous logical networks to coexist within the data center, while maintaining isolation between the networks (i.e., a packet sent by a VM on a first logical network cannot be received by a VM on a second logical network). In many cases, the virtual switch 210 will have virtual ports associated with numerous different virtual machines on numerous different logical networks, each of which has its own logical network identifier. In some embodiments, each of these virtual ports maps to a logical port, or distributed virtual port, for which the virtual switch stores the information.

In addition to enabling the VMs to connect to the virtual switch, the virtual ports provide interfaces for other components that operate on the host, including components within the virtualization software. For instance, as shown, the control interface 220 and the VTEP 215 both attach to the virtual switch at virtual ports 255 and 260, respectively.

The control interface 220 of some embodiments communicates (through a virtual switch, such as virtual switch 210) with one or more controllers external to the host, such as the controller 285. These controllers, in some embodiments, send commands to the host machine in order to configure the virtual switch, initiate the creation or migration of VMs, etc. In addition, the controllers can send commands to test the connectivity between the host machine 200 and one or more additional host machines (e.g., in the data center). The control interface 220, in some embodiments, also sends replies back to the controllers—e.g., VM and/or virtual switch status data, connectivity test results, etc. While described as communicating with network controllers, in some embodiments the control interface receives commands from and sends replies to an administrator that is directly logged into the host.

The configuration daemon 225 of some embodiments represents one or more components in the virtualization software 205 that initiate configuration-related processes. In some embodiments, one or more daemons within the virtualization software listen for incoming control information on the control interface 220, and initiate various processes as a result. Specifically, the configuration daemon 225 initiates connectivity test processes when the control interface 220 receives a request to do so. The configuration daemon identifies the incoming request and initiates the packet creation process in the packet generator 240.

The packet generator 240 is a software process that runs on the host machine 200 to generate ICMP packets in some embodiments. That is, the packet generator receives information regarding a requested connectivity test from the configuration daemon 225 or another module in the virtualization software, and generates the necessary packet or packets. The packet generator then sends the generated packet to the VTEP 215.

The VTEP 215 is a virtual tunnel endpoint that also provides a link between the packet generator and the virtual switch 210. In addition, the VTEP 215 connects directly to at least one of the physical NICs 245. This enables the virtual switch to send certain packets out to the physical network 275 through the VTEP 215. The VTEP, in some embodiments, encapsulates the packet in a tunnel based on the packet's destination address and logical network identifier, before sending the packet through the NIC onto the physical network. The VTEP has its own layer 2 (e.g., MAC) and layer 3 (e.g., IP) addresses, and also stores VTEP data 270. This VTEP data, in some embodiments, includes a table that maps destination MAC addresses and logical network identifiers to remote VTEP addresses (e.g., remote IP addresses).

Figure 3:
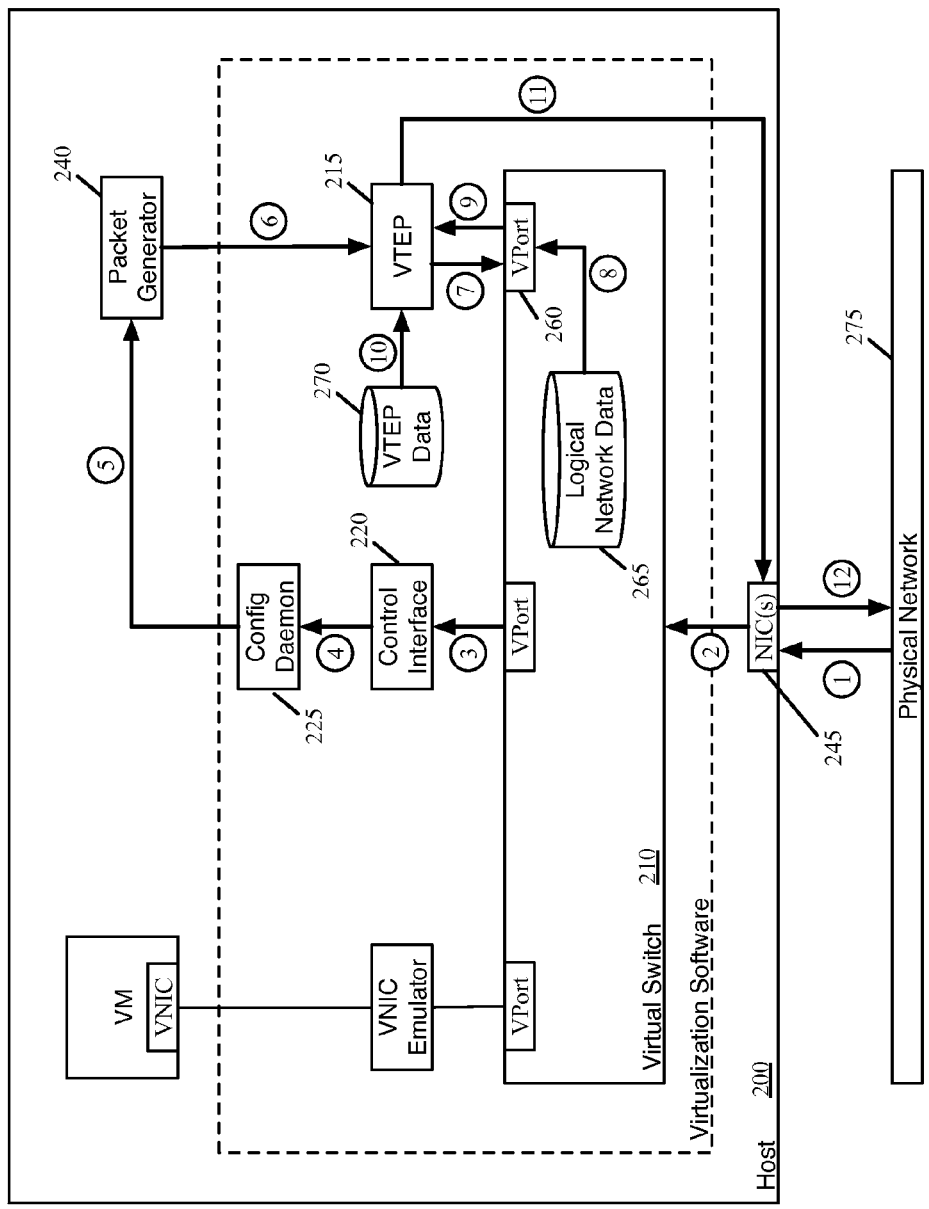
FIG. 3 conceptually illustrates the operation of the host machine of FIG. 2 to generate and send a packet for a connectivity test operation.

The operation of the host machine 200 to generate and send a packet for a connectivity test operation will be described by reference to FIG. 3. This figure illustrates the host 200, along with various encircled numbers that represent the flow of different types of data into, within, and out of the host machine 200 in order to perform a requested connectivity test operation.

As shown by the encircled 1, the host machine 200 initially receives a command through one of its NICs 245 requesting that the host machine test connectivity between itself and at least one other host machine. In some embodiments, the command also specifies a particular logical network, supported on the host machine, over which the packet should be sent. In some embodiments, the physical network 275 over which the command is received is the same infrastructure as that used for the logical network traffic. In other embodiments, a separate physical infrastructure (and separate NICs and virtual switch on the host machines) is used within the data center for control messages.

Indicated by the encircled 2, this command is sent from the NIC to the virtual switch 210. In other embodiments, however, control messages are received at a separate NIC that does not connect to the virtual switch, and instead are sent directly from the NIC to the control interface, or through a separate virtual switch to the control interface. In this example, the virtual switch 210 identifies that the packet or packets that carry this command should go to the control interface 230, and sends the command there as shown by the encircled 3.

At this point, the configuration daemon 225, which listens on the control interface 220 for incoming commands, configuration changes, etc. identifies that the control interface has received a command to perform a connectivity test operation, as shown by the encircled 4. In addition, the configuration daemon 225 identifies the logical network over which the test packet(s) should be sent, as well as the destination addresses.

The configuration daemon 225 initiates the packet generation by the packet generator 240, as shown by the encircled 5. In some embodiments, the configuration daemon 225 is responsible for starting up a packet generation instance. In other embodiments, the packet generator is already operating, and the configuration daemon 225 is responsible for instructing the packet generator to create connectivity test packets to a particular destination.

The packet generator 240 then creates a packet and sends the packet to the VTEP 215, as shown by the encircled 6. In some embodiments, this packet is an ICMP echo request (i.e., ping) packet. The packet created by the packet generator does not have any logical network or encapsulation information, as the virtual switch 210 and/or VTEP 215 are responsible for appending this information.

In some embodiments, as shown by the encircled 7, the VTEP passes this packet to the virtual switch 210 via the virtual port 260. The virtual switch 210 utilizes the logical network data 265, as shown by the encircled 8, to append logical network information to the packet. This logical network information includes a logical network identifier, in some embodiments. For example, in some embodiments the logical networks are created using VXLAN, in which case the virtual switch adds a VXLAN network identifier to the packet. In addition to the logical network identifier, the logical network information may also provide space for one or more flags to mark the packet. These flags may have various uses, including identification of the packet as a test packet that should not be delivered to the destination VM. That is, if the packet was not flagged as a test packet, then the receiving VTEP would send the ICMP packet to the VM. However, because the purpose is to test connectivity between the VTEPs, the flag enables the receiving VTEP to identify that it should generate an ICMP response (or have a packet generator on the receiving host generate the ICMP response) and avoid delivering the packet to the VM.

With the logical network data added, the virtual switch sends the packet back to the VTEP 215, as shown by the encircled 9. The VTEP 215 adds tunnel encapsulation to the packet over the logical network information. The tunnel encapsulation, in some embodiments, includes source and destination addresses of the tunnel endpoints. That is, the source addresses are those of the VTEP 215, and the destination addresses are those of the VTEP at the destination host machine (e.g., MAC and IP addresses). This encapsulation allows what are otherwise layer 2 packets between VMs (in the case of normal logical network traffic between VMs) to be sent over a layer 3 network. The intervening network elements need not store any information about the logical networks, but can simply forward the packets based on the VTEP addresses.

In order to add the tunnel encapsulation, the VTEP 215 of some embodiments uses VTEP data 270. In some embodiments, this VTEP data stores a table that maps destination MAC addresses and logical network identifiers to remote VTEP addresses (e.g., remote IP addresses). While this example shows the packet sent from the VTEP to the virtual switch in order to have the logical network information added, in some embodiments the VTEP itself adds the logical network information along with the tunnel information. In this case, operations 7-9 are not performed, but instead operation 10 retrieves additional data for appending data to the packet and subsequently encapsulating the packet.

In the case of a broadcast or multicast packet, in some embodiments the VTEP 215 replicates the packet before adding the encapsulation. As described in the section below, for broadcast or multicast packets, the VTEP may use proxies in other network segments so as to avoid sending out a large number of packets. After replicating the packet, the VTEP encapsulates each packet with the addresses for the different tunnels to the intended recipients in a broadcast or multicast group. The VTEP then sends the one or more packets directly to the NIC in some embodiments, and from the NIC onto the physical network (as shown by the encircled 11 and 12, respectively).

Once the host machine 200 has sent the packets onto the physical network, the machine awaits receipt of response packets from the host machines to which the packets were sent. In some embodiments, the destination hosts send ICMP echo reply packets back to the source host machine. However, some embodiments do not encapsulate the reply packets, but instead send the response directly back to the destination. As such, when the host machine 200 receives a reply packet, the virtual switch 210 does not forward the packet to the VTEP in some embodiments. Instead, the control interface receives and processes the reply packet (and, e.g., sends the results back to the controller that requested the connectivity test operation).

II. Test Packet Transmission and Receipt

The above section described in detail the host machine and the mechanisms in the host machine to generate and encapsulate a test packet (e.g., an ICMP echo request packet encapsulated in a tunnel). This section will now describe certain aspects of the transmission and receipt of such packets, especially for broadcast and multicast destinations.

Figure 4:
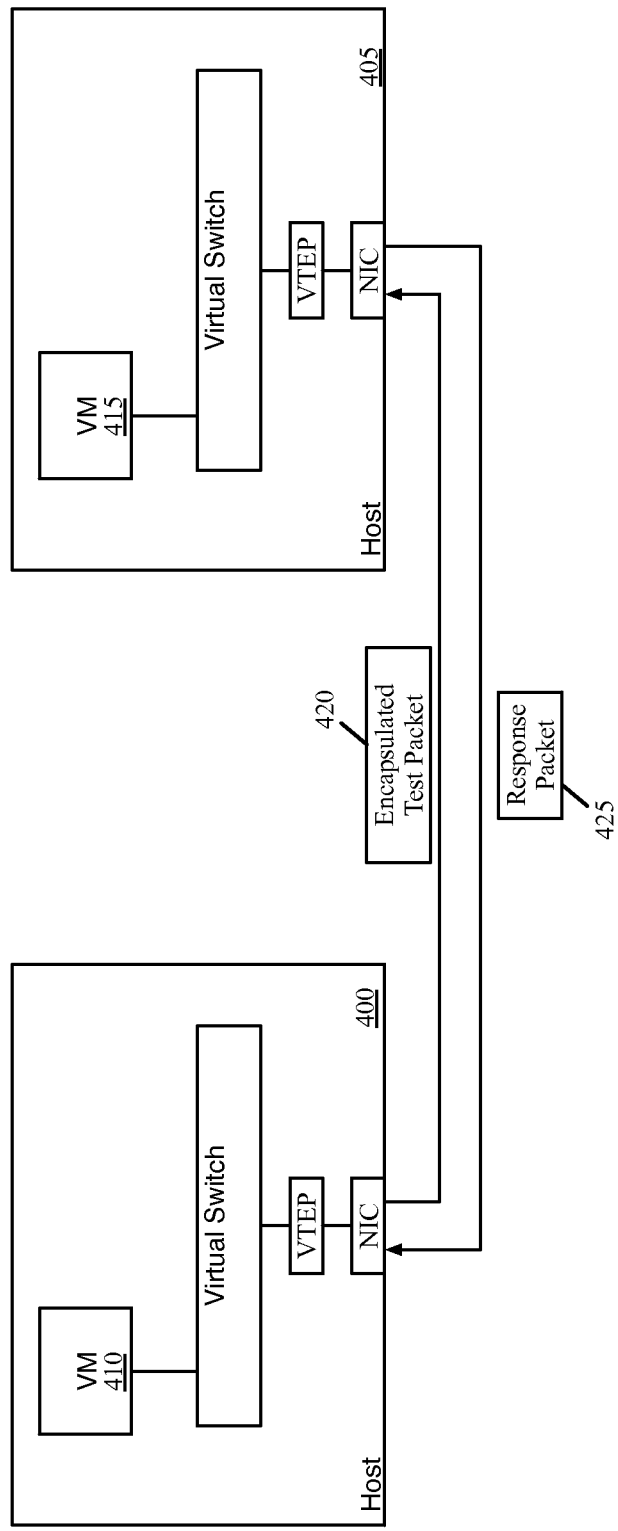
FIG. 4 conceptually illustrates the transmission of a unicast connectivity test packet and a response packet sent from the destination host.

FIG. 4 conceptually illustrates the transmission of a unicast connectivity test packet and the response packet sent from the destination host. Specifically, this figure illustrates a first host machine 400 that generates and sends an encapsulated test packet to a second host machine 405, and receives a response packet back from the second host machine 405. In this figure, each of the host machines is shown as having a virtual switch, at least one VM attached to the virtual switch, and a VTEP. The virtual machine 410 that operates on the first host 400 is on the same logical network as the virtual machine 415 that operates on the second host 405. That is, using a logical network identifier (e.g., a VXLAN ID), the two VMs 410 and 415 can exchange data traffic, which is encapsulated between the VTEPs on their respective hosts.

In this case, in response to a request to test the connectivity between the VM 410 and the VM 415 (e.g., because an administrator has identified that packets sent from one to the other may be getting dropped), the first host machine 400 generates and encapsulates a test packet 420 to send to the second host machine 415. In some embodiments, the first host machine generates the packet as shown in FIG. 4 above. The test packet 420 is encapsulated so as to emulate logical network traffic between the two VMs 410 and 415. An example of such a packet will be described below by reference to FIG. 5.

Upon receiving the encapsulated test packet at host machine 405, the VTEP on this host machine removes the encapsulation in some embodiments. Although this figure illustrates the VTEP between the NIC and the virtual switch, one of ordinary skill in the art will recognize that in some embodiments both host machines 400 and 405 are structured similarly to the host machine 200. In some such embodiments, the encapsulated test packet is received first by the virtual switch at the host machine 405, which forwards the test packet to the VTEP. The VTEP removes the encapsulation and, in some embodiments, sends the packet back to the virtual switch. The virtual switch then removes the logical network identifier, and in doing so identifies the flag that marks the packet as a test packet. This flag identifies that the packet should not be delivered to a VM (e.g., VM 415), but instead a process running on the host machine (e.g., a packet generator similar to that shown in FIG. 2) should generate a response packet 425.

Some embodiments do not encapsulate the packet 425. Instead of sending the packet out onto the network through the VTEP, some such embodiments send the packet directly from the virtual switch to the physical NIC. As a result, in certain cases (e.g., those described below), the response packet will take a different path through the physical network compared to the original test packet. When the first host machine 400 of some embodiments receives the response packet 425, the virtual switch on the host machine identifies the proper destination for the response packet (e.g., the control interface, the packet generator, etc.). Because this packet is not encapsulated, the virtual switch of some embodiments does not send the packet to the VTEP.

The host machine then notifies the controller, or other entity that requested the connectivity test, of the results of the test. These results may include whether a packet was received (the test may use a timeout, after which the host determines that the connection between the host machines is down), the elapsed time between sending the encapsulated test packet and receipt of the response packet. In some embodiments, the host sends several test packets, and the report identifies an average elapsed time, the percentage of packets that were returned, etc.

Figure 5:
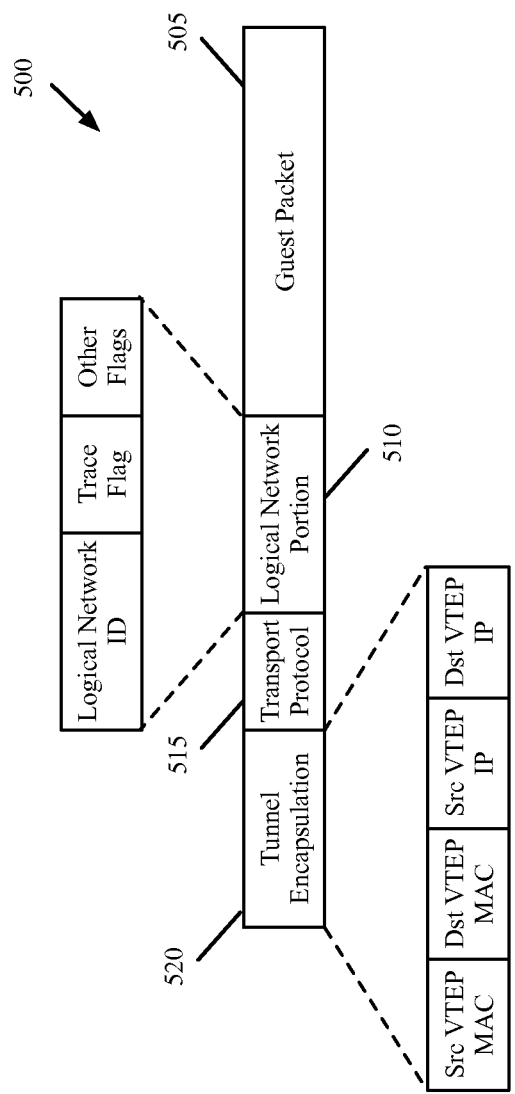
FIG. 5 conceptually illustrates a test packet that has logical network information appended and is encapsulated with a tunnel header.

As mentioned, the test packets sent by the host machine that receives the command to initiate a connectivity test first have logical network information appended and are then encapsulated with a tunnel header. FIG. 5 conceptually illustrates such a packet 500. In the previous figure, the encapsulated test packet 420 is an example of such a packet, as well.

The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

The packet 500 contains a guest packet 505, a logical network portion 510, a transport protocol section 515, and a tunnel encapsulation 520. The guest packet 505 is, in some embodiments, the original ethernet frame (or other type of packet) that is carried over the overlay network by the logical network information and tunnel encapsulation. For standard VM traffic, this guest packet 505 is what the VMs send and/or receive (e.g., the standard data frames). For the case of encapsulated test packet 420, the guest packet is an ICMP echo request in some embodiments.

The logical network portion 510, added to the packet by the virtual switch in some embodiments, enables the use of numerous overlay networks over a single physical network (e.g., within a data center). As shown, the logical network portion 510 of some embodiments includes a logical network identifier and various flags, including a trace flag. In some embodiments, the logical network identifier (e.g., a VXLAN ID) is a 24-bit segment ID that enables numerous different logical networks to co-exist on a common physical infrastructure. However, the logical network identifier may also include other types of identifiers in various different embodiments, and is not specifically limited to VXLAN. In addition to the logical network ID, the logical network portion includes various flags that may be used by the virtual switch to transport information about the packet. Specifically, in this case, the packet includes a trace flag. This trace flag may be a single bit flag that is, e.g., set to 1 when the packet is a connectivity test and set to 0 for standard network traffic. The other flags may include information, such as that the packet needs to be proxied to other hosts by the receiving host, as described below for broadcast or multicast packets.

The transport protocol section 515, in some embodiments, carries information about the transport protocol used for logical network traffic between host machines. For example, in some embodiments this section 515 is a UDP header. The transport protocol section of some embodiments identifies that the internal packet is a logical network packet with a specific format (e.g., VXLAN). The use of UDP in some embodiments brings about the use of connectivity test packets to determine whether tunnel endpoints are reachable. UDP does not use keep-alives or other automatic testing mechanisms to determine on a regular basis whether tunnel endpoints are reachable, and therefore connectivity tests as described herein may be used.

The tunnel encapsulation section 520 of some embodiments enables the sending of the packet 500 over the physical layer 3 network without the underlying network infrastructure storing any information about the logical network information 510 or the VM addresses stored in the guest packet 505. As shown, the tunnel encapsulation section of some embodiments contains (i) a source VTEP MAC address, (ii) a destination VTEP MAC address, (iii) a source VTEP IP address, and (iv) a destination VTEP IP address. In the example shown in FIG. 4, the encapsulation on the test packet 420 uses the addresses of the VTEP located at host 400 for its source addresses and the addresses of the VTEP located at host 405 for its destination addresses. As mentioned above, in some embodiments the source VTEP stores this tunnel address information (e.g., in one or more tables) and adds the information to the packet before sending the packet onto the physical network. When necessary, the VTEP may use Address Resolution Protocol (ARP) to identify the MAC address of another tunnel endpoint, or flood the packet to all hosts participating in the logical network.

Figure 6:
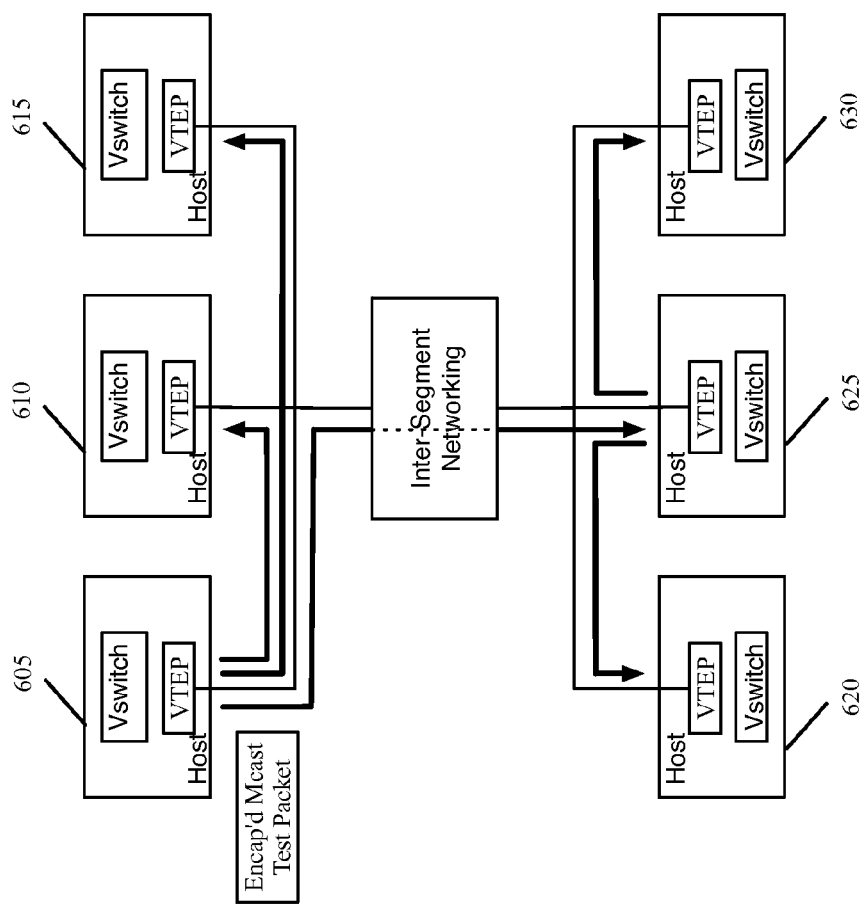
FIGS. 6 and 7 conceptually illustrate encapsulated test packets and the subsequent responses for a multicast packet.
Figure 7:
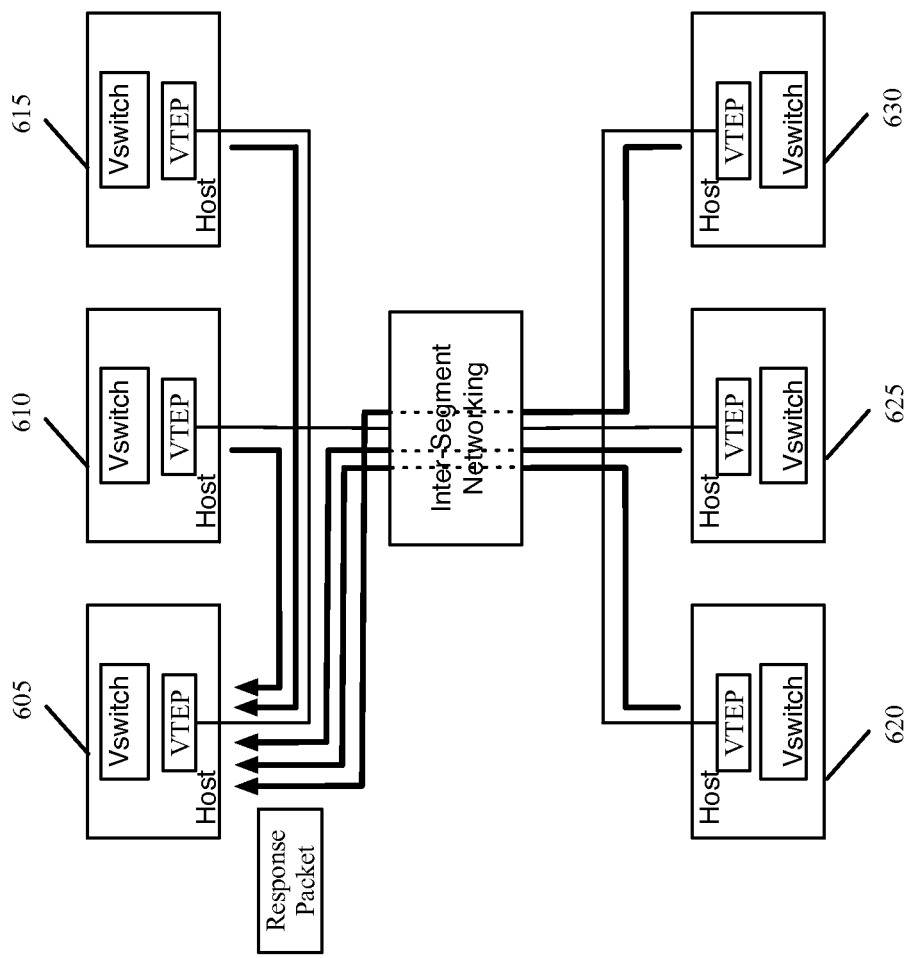

The above FIG. 4 illustrated a connectivity test for a single (unicast) destination, with both the encapsulated test packet and the unencapsulated response sent over the same direct tunnel between the two host machines. FIGS. 6 and 7 conceptually illustrate the encapsulated test packets and the subsequent responses for a multicast packet. In some embodiments, the logical network may have several network segments. For instance, the machines in a logical network may be divided into segments based on subnets, physical location (e.g., all VMs located on a particular rack or closely-clustered set of racks are a single segment), or other criteria. As described in detail in U.S. patent application Ser. No. 14/020,369, published as U.S. Patent Publication 2015/0055651, entitled "Distributed Multicast by Endpoints", which is incorporated herein by reference, some embodiments designate multicast proxies in each segment for receiving multicast packets and replicating the multicast packets (as unicast packets) to each recipient within the segment.

FIG. 6 illustrates the sending of a multicast connectivity test packet in a logical network with two multicast segments. Specifically, the host machines 605-615 make up a first multicast segment, while the host machines 620-630 make up a second multicast segment. In many cases, each multicast segment might have numerous host machines, only some of which are in a particular multicast group. Each logical network present within a segment may have its own multicast group that includes hosts on which the logical network is present in such embodiments (e.g., hosts on which a VM connected to the logical network is hosted). While this example shows three hosts in each segment, one of ordinary skill will recognize that each segment may have numerous additional hosts that are not in the multicast group to which the test packet is sent, and therefore are not shown in this figure.

In this case, the three hosts 605-615 are in a first subnet, while the three hosts 620-630 are in a second subnet. In some embodiments, these subnets refer to the IP addresses of the tunnel endpoints (e.g., VTEPs) of the hosts. Preceding the sending of the test packets shown in FIG. 6, the host machine 605 might have received a command to test the broadcast connectivity on a particular logical network that stretches across the six hosts 605-630. The host machine generates a test packet, and determines that the broadcast destination should be converted to an IP multicast group that stretches across the two segments.

As described in detail in U.S. application Ser. No. 14/020, 369, the tunnel endpoint converts the multicast packet to several unicast packets based on information stored in its tables (e.g., the VTEP data 270 of FIG. 2). First, the tunnel endpoint at host 605 sends unicast packets to the tunnel endpoints at the other host machines 610 and 615 within its network segment. In addition, the tunnel endpoint data specifies a multicast proxy destination in each of the other network segments that are part of the multicast group. In this case, the segment with hosts 620-630 is the only other such segment, and the host 625 has been specified (e.g., by a network controller) as the multicast proxy for that network segment. As such, the tunnel endpoint at host 605 also sends a unicast packet to the tunnel endpoint at host 625. All of these packets are encapsulated as shown in FIG. 5, in some embodiments. As the packets are unicast, at least from the tunnel perspective, each packet specifies a particular tunnel endpoint in the encapsulation header. As shown, the packet sent to the host 625 is sent through inter-segment networking (e.g., a router that routes packets between subnets).

When the tunnel endpoint at the multicast proxy host 625 for the second segment receives the packet, this tunnel endpoint decapsulates the packet and recognizes that the internal packet is a multicast or broadcast packet that should be replicated to the other tunnel endpoints in the segment that belong to the specified multicast group. In addition, the host (e.g., the virtual machine, the tunnel endpoint, etc.) recognizes the packet as a connectivity test packet, as indicated by the trace flag in the logical network header, and therefore should be processed by a particular module on the host 625 rather than delivered to a virtual machine.

The tunnel endpoint at the proxy host 625 replicates the packet and sends unicast packets to each of the other tunnel endpoints in its segment, in this case the endpoints at hosts 620 and 630. The tunnel endpoint at the proxy host encapsulates the new packets with its own address for the source address and the respective addresses of the tunnel endpoints at hosts 620 and 630 as the destinations addresses. By having the multicast packets sent using the tunnel first to the multicast proxy host endpoints and then from the proxy to the other hosts in the network segment, the encapsulation allows the packets to travel over the network path they would take for normal multicast traffic on the logical network (e.g., if a VM on the logical network sent an ARP request).

Although the test packets are sent as tunneled packets, some embodiments send unencapsulated (i.e., non-tunneled) packets in response. These packets are unicast packets that do not travel through the proxy in order to return to the original source host (which can be identified at each recipient through the underlying guest packet). Therefore, as shown in FIG. 7, each of the hosts 610-630 sends a separate unencapsulated response packet (e.g., an ICMP echo reply) to the host 605. As these packets are not encapsulated, the virtual switch at host 605 does not direct the packets to its tunnel endpoint, but instead to the process responsible for carrying out the connectivity testing process (e.g., the packet generator, control interface, or another module).

In other embodiments, however, these reply packets are sent encapsulated over the network, both within the first segment and from the second segment to the first segment. In this case, the virtual switch at the host 605 sends the packet initially to its tunnel endpoint for processing (i.e., to remove the tunnel encapsulation) before handing the reply packet off to the appropriate module.

In the examples shown in FIGS. 4, 6, and 7, all of the test packets reach the intended destination, and therefore the originating host machine receives replies from all of these destination machines (i.e., one machine in the first example, and five machines in the second example). In this case, the host machine would report back to the controller that the ping operation was successful, and any statistics associated with the operation (e.g., elapsed time, percentage of packets received, etc.). If no responses are received after a set amount of time, then the host machine reports back to the controller that the operation failed. In the multicast case, the originating host machine may not be aware of all destinations in some embodiments. In this case, if one or more destinations is unreachable, the originating host may simply report to the controller the machines that were successfully reached. The controller, which stores information on the locations of the virtual machines in a network, would be able to identify which host machines were unreachable.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
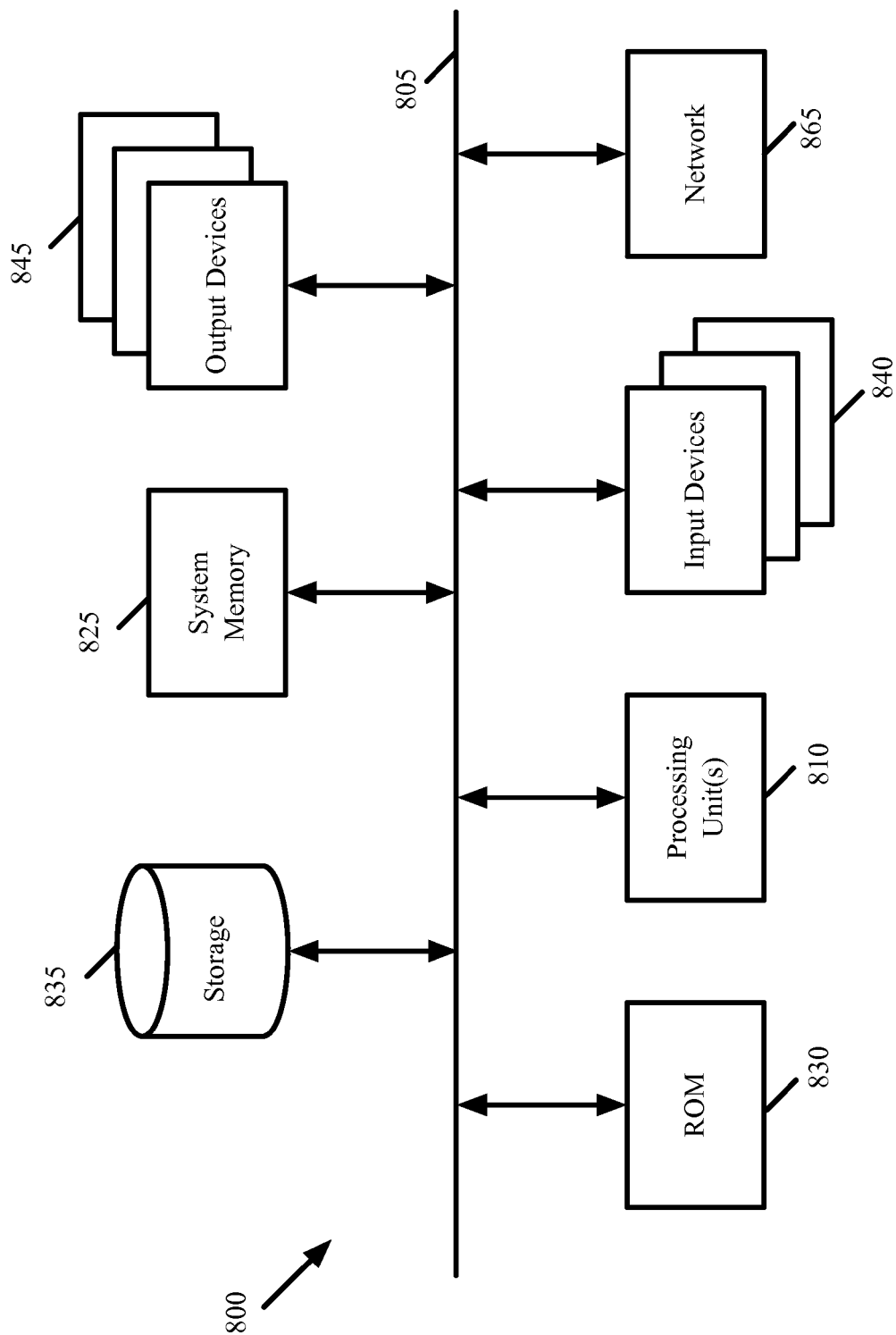
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 1) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first forwarding element to which a first machine connects, the first machine belonging to a particular logical network, a method comprising:

receiving a command to test connectivity between the first forwarding element and a plurality of additional forwarding elements to which a plurality of additional machines that belong to the particular logical network connect, wherein at least two of the additional forwarding elements are located in a different multicast segment of a physical network than the first forwarding element;

instructing a packet generator connected to the first forwarding element to generate a test packet to send to the plurality of additional forwarding elements;

encapsulating a plurality of copies of the generated test packet with tunnel endpoint addresses, each copy of the generated test packet encapsulated with a tunnel endpoint address for the first forwarding element and a tunnel endpoint address of another forwarding element of the plurality of additional forwarding elements, wherein only a single generated test packet is encapsulated with a particular tunnel endpoint address for the at least two forwarding elements located in the different multicast segment; and sending the encapsulated packets through a physical network, wherein the single generated test packet is received at a particular managed forwarding element corresponding to the particular tunnel endpoint address and distributed by the particular forwarding element to the other forwarding elements of the at least two forwarding elements located in the different multicast segment.

2. The method of claim 1 further comprising, prior to encapsulating the plurality of copies of the generated test packet, appending logical network information to the generated test packet.

3. The method of claim 2, wherein the logical network information comprises an identifier of the particular logical network and information indicating that the packet is a test packet.

4. The method of claim 1 further comprising:
receiving the generated test packet from the packet generator;
replicating the received generated test packet for each additional forwarding element in a same multicast segment of the physical network as the first forwarding element.

5. The method of claim 4 further comprising replicating the generated test packet for each multicast segment, other than the multicast segment of the first forwarding element, in which at least one of the additional forwarding elements is located.

6. The method of claim 1, wherein the first forwarding element operates in a virtualization software of a physical machine, wherein the first machine and the packet generator operate outside the virtualization software on the physical machine.

7. The method of claim 6, wherein the first forwarding element comprises a virtual switch and a virtual tunnel endpoint.

8. The method of claim 7, wherein the virtual tunnel endpoint connects to a first port of the virtual switch and the first machine connects to a second port of the virtual switch.

9. The method of claim 1, wherein the tunnel endpoint addresses are layer 3 network addresses.

10. The method of claim 1 further comprising receiving response packets from a set of the additional forwarding elements located in the different multicast segment.

11. A non-transitory machine readable medium storing a first forwarding element to which a first machine connects, the first machine belonging to a particular logical network, the first forwarding element comprising sets of instructions for:
receiving a command to test connectivity between the first forwarding element and a plurality of additional forwarding elements to which a plurality of additional machines that belong to the particular logical network connect, wherein at least two of the additional forwarding elements are located in a different multicast segment of a physical network than the first forwarding element;
instructing a packet generator connected to the first forwarding element to generate a test packet to send to the plurality of additional forwarding elements;
encapsulating a plurality of copies of the generated test packet with tunnel endpoint addresses, each copy of the generated test packet encapsulated with a tunnel endpoint address for the first forwarding element and a tunnel endpoint address of another forwarding element of the plurality of additional forwarding elements, wherein only a single generated test packet is encapsulated with a particular tunnel endpoint address for the at least two forwarding elements located in the different multicast segment; and sending the encapsulated packets through a physical network, wherein the single generated test packet is received at a particular managed forwarding element corresponding to the particular tunnel endpoint address and distributed by the particular forwarding element to the other forwarding elements of the at least two forwarding elements located in the different multicast segment.

12. The non-transitory machine readable medium of claim 11, wherein the first forwarding element further comprises a set of instructions for, prior to encapsulating the plurality of copies of the generated test packet, appending logical network information to the generated test packet.

13. The non-transitory machine readable medium of claim 12, wherein the logical network information comprises an identifier of the particular logical network and information indicating that the packet is a test packet.

14. The non-transitory machine readable medium of claim 11, wherein the first forwarding element further comprises sets of instructions for:
receiving the generated test packet from the packet generator;
replicating the received generated test packet for each additional forwarding element in a same multicast segment of the physical network as the first forwarding element.

15. The non-transitory machine readable medium of claim 14, wherein the first forwarding element further comprises a set of instructions for replicating the generated test packet for each multicast segment, other than the multicast segment of the first forwarding element, in which at least one of the additional forwarding elements is located.

16. The non-transitory machine readable medium of claim 11, wherein the first forwarding element executes in a virtualization software of a physical machine, wherein the first machine and the packet generator operate outside the virtualization software on the physical machine.

17. The non-transitory machine readable medium of claim 16, wherein the first forwarding element comprises a virtual switch and a virtual tunnel endpoint.

18. The non-transitory machine readable medium of claim 17, wherein the virtual tunnel endpoint connects to a first port of the virtual switch and the first machine connects to a second port of the virtual switch.

19. The non-transitory machine readable medium of claim 11, wherein the tunnel endpoint addresses are layer 3 network addresses.

20. The non-transitory machine readable medium of claim 11, wherein the first forwarding element further comprises a set of instructions for receiving response packets from a set of the additional forwarding elements located in the different multicast segment.

* * * * *